No. 683,526. Patented Oct. 1, 1901.
T. R. TYNDALL.
TOBACCO TRUCK.
(Application filed May 23, 1901.)

(No Model.)

T. R. Tyndall, Inventor.

Witnesses:

UNITED STATES PATENT OFFICE.

THOMAS RUFFIN TYNDALL, OF WINTERVILLE, NORTH CAROLINA.

TOBACCO-TRUCK.

SPECIFICATION forming part of Letters Patent No. 683,526, dated October 1, 1901.

Application filed May 23, 1901. Serial No. 61,572. (No model.)

*To all whom it may concern:*

Be it known that I, THOMAS RUFFIN TYNDALL, a citizen of the United States, residing at Winterville, in the county of Pitt and State of North Carolina, have invented a new and useful Tobacco-Truck, of which the following is a specification.

This invention relates to tobacco-trucks, and more particularly to the manner of supporting the front wheel thereof.

The object is to provide a truck having its front wheel so disposed with relation to the body portion that the draft will be directly from its wheel, thereby putting the wheel under the direct control of the horse, the arrangement causing the truck to turn easily in any direction the horse is driven and rendering it possible to turn the truck in a circle the diameter of which is equal to the length of the truck.

A further object is to so construct and assemble the parts of the front-wheel truck as to render it capable without multiplicity of parts or great weight of resisting tendency of breakage due to lateral strain in short turning.

A further object is to connect the draw-beam with the front truck in such manner that strain from the beam will be distributed throughout the length of the truck.

With these and other objects in view the invention consists in the novel construction and combination of parts of a tobacco-truck wheel and truck therefor, as will be hereinafter fully described and claimed.

In the accompanying drawings, forming a part of this specification, and in which like numerals of reference indicate corresponding parts, I have illustrated a form of embodiment of my invention, it being understood that the same may be changed in minor details of construction without departing from the spirit of the invention.

Figure 1:
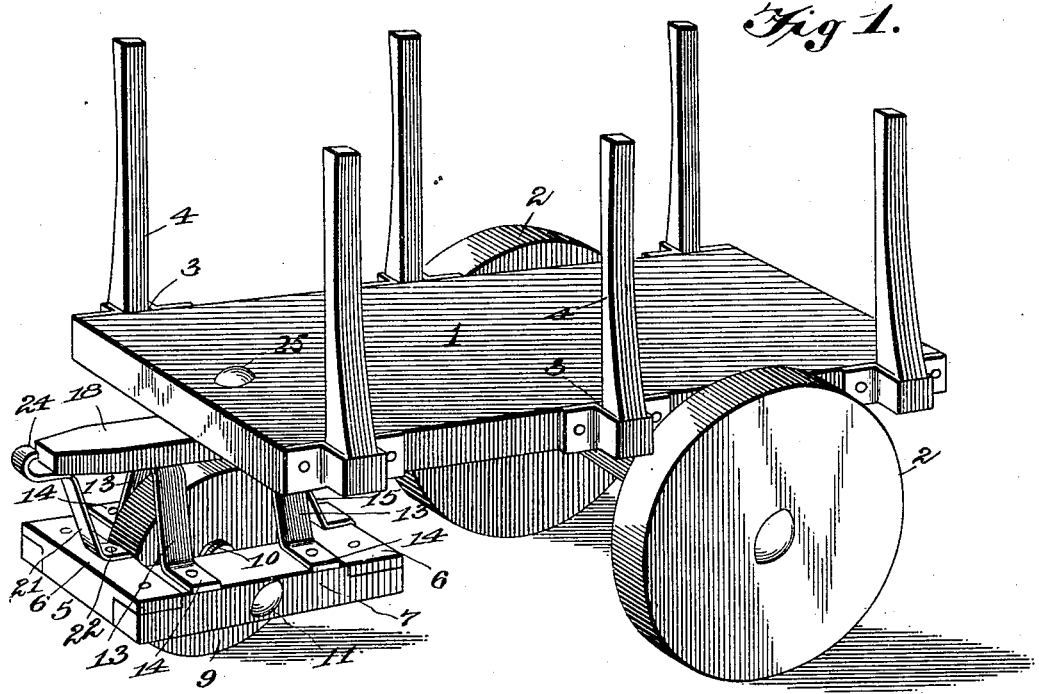
Figure 2:
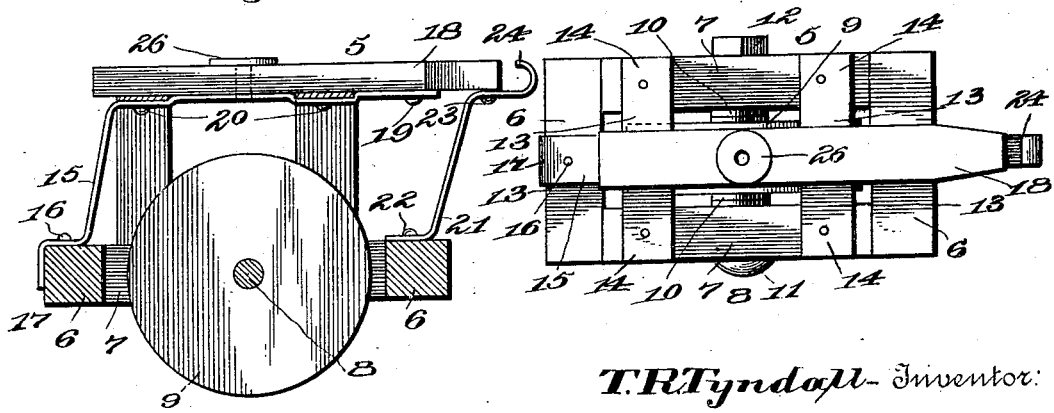
Figure 3:
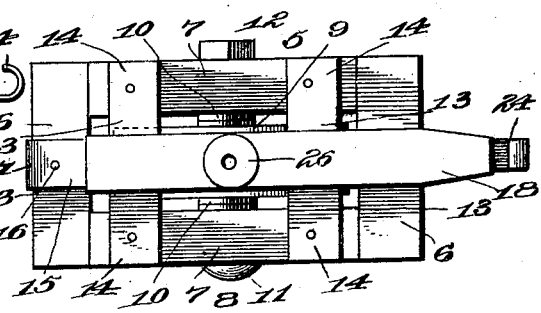

In the drawings, Figure 1 is a view in perspective of the truck. Fig. 2 is a longitudinal vertical section of the front-wheel truck. Fig. 3 is a view in plan of the front-wheel truck.

The body 1 and rear wheels 2 of the truck may be of any preferred construction, and therefore need no detailed description other than to say, generally, that the body 1 is the ordinary usual flat platform provided along its sides with keepers 3 to be engaged by stanchions 4, these stanchions to have secured to them canvas or cloth constituting the body.

The invention resides in the front truck 5. This truck comprises an open substantially horizontal truck-frame 6, constructed, preferably, of timbers suitably bolted together to present a rectangular structure, and through the side beams 7 of this truck passes the axle 8 for the front wheel 9, suitable washers 10 being inserted between the sides of the wheel and the beam 7 to prevent interference between these parts. It will here be noted that the open frame entirely surrounds the wheel and forms a fender therefor. As herein shown, the axle 8 is composed of a bolt 11, carrying a nut 12; but it is to be understood that I do not confine myself to the particular form of axle shown nor the manner in which the wheel is mounted thereon, as I may vary this construction and still be within the scope of my invention. Secured to the top of the frame and near each end are two braces 13, the same being provided with feet or extensions 14 to be bolted to the side beams 7 of the truck. These braces are by preference of metal and made in the shape shown or differently shaped.

Secured to one of the cross-beams, the rear one in use, is an end brace 15, the same having one end secured to the beam 6 by a bolt or bolts 16 and having its end turned down over the side of the beam, as at 17, at which point it may be secured. The end brace bears against the under side of each of the braces 13 and extends some distance out beyond the front brace and is secured to the draw-beam 18 by bolts 19, this beam 18 being also secured to the braces 13 by bolts 20. It will be seen by this arrangement that the strain from the draw-beam is distributed to the end brace 15 and side braces 13 and that by reason of the manner of assembling the three braces with the beam end strain or lateral strain will be so distributed that racking or loosening of the parts will be obviated. At the front of the truck is secured an end brace 21, this having its lower end secured to one of the beams 6 by bolts 22 and to the under side of the beam 18 by bolts 23, the end of this brace 21 being extended outward beyond the beam 18 and formed into a hook 24 to be engaged by a ring of the singletree when the device is in use.

The truck is held assembled with relation to the body by a king-bolt 25, which passes through the floor of the structure and through the beam 18 and end brace 15 in line with the axle of the wheel 9, a wear-plate 26 being interposed between the beam 18 and the under side of the truck-bottom to permit free rotation of the truck 5. By arranging the truck-wheel under the truck-body instead of above it, as usual, and by connecting the horse directly with this truck it will be seen that the draft is directly applied to the truck, so that it will be readily responsive to the slightest lateral strain applied to it by the horse, and by reason of the fact that it is free to turn through a complete circle under the truck-body the truck proper can be turned in a circle the diameter of which is no longer than the truck.

It is to be understood, of course, that I do not confine myself to the exact mode of bracing the truck 5 nor of the exact manner in which the parts are assembled, as these may be changed or altered to suit the requirements of different cases, the object being, however, so to construct and assemble the parts of this truck that it will be securely braced against any tendency to yield to lateral strain.

It is to be understood that this front truck may be made as an article of manufacture and sold to persons employing the ordinary trucks, to which it may be applied by a person of ordinary skill, as it will only require an opening in the bottom of the truck proper for the reception of a king-bolt 25 to assemble the front truck with the truck proper. For this reason, therefore, I desire it to be understood distinctly that I do not limit my invention to the combination of the particular truck described with a tobacco-truck, the broader conception of the invention residing in the front truck *per se*.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what I claim is—

1. The combination with a wheeled body, of a draw-bar swiveled intermediate of its ends to the lower side of the body, and having its forward end provided with a draft connection, a substantially horizontal skeleton frame located below the draw-bar, a wheel mounted within the frame, whereby the latter surrounds the wheel and forms a fender therefor, and front and rear braces between the draw-bar and the frame.

2. In a tobacco-truck, the combination with the body, of a front-wheel-supporting truck arranged directly beneath the body so that the weight from the truck proper is directly upon the wheel, the front-wheel truck comprising a rectangular supporting and inclosing frame between the members of which the wheel is journaled, braces secured to the sides and ends of the frame and bridging the wheel, and a draw-beam secured to the braces and arranged above the wheel and projecting outward beyond the truck-frame and provided with means for attachment to a singletree.

3. The combination with a tobacco-truck, of a front-wheel-truck frame comprising a rectangular base-frame between the members of which the wheel is journaled, two side braces connected with the side beams of the truck and arched over the wheel, two end braces, the rear one extending from the rear of the truck to a point near the forward end thereof, a front end brace connected with the truck-frame and extended upward in line with the front portion of the rear brace, and a draw-beam connected with the side braces and end braces, the front end of the beam being provided with a hook or the like to permit attachment to a singletree.

4. In a tobacco-truck, the combination with the body, of a front-wheel-truck frame comprising a supporting-frame between the members of which the front wheel is journaled, a draw-beam, and side and end braces connecting the base-frame and the draw-beam, and means, as a king-bolt or the like, for connecting the draw-beam with the body of the truck, the king-bolt to be in vertical alinement with the axle of the front-wheel truck, whereby the weight of the truck proper is transmitted directly to the front wheel, thus obviating tendency of the truck to tilt forward or backward in operation, resulting in easy operation of the front-truck wheel in turning the truck proper in different directions.

5. A truck comprising an open substantially horizontal frame, a wheel journaled within the frame, whereby the latter surrounds the wheel and forms a fender therefor, and a draw-bar carried by the frame, located above the wheel and provided at its forward end with a draft connection, and at an intermediate point with a king-bolt socket located above the axle of the wheel.

In testimony that I claim the foregoing as my own I have hereto affixed my signature in the presence of two witnesses.

THOS. RUFFIN TYNDALL.

Witnesses:
A. G. COX,
J. F. HARRINGTON.